(12) United States Patent  (10) Patent No.: US 7,721,565 B2
Williams et al.  (45) Date of Patent: May 25, 2010

(54) HVAC LATERAL CONDENSATE DRAIN CHANNEL

(75) Inventors: Brian R. Williams, Troy, MI (US); Steven B. Marshall, Oxford, MI (US)

(73) Assignee: Valeo Climate Control Corp., Auburn Hills, MI (US)

( * ) Notice: Subject to any disclaimer, the term of this patent is extended or adjusted under 35 U.S.C. 154(b) by 333 days.

(21) Appl. No.: 11/788,333

(22) Filed: Apr. 19, 2007

(65) Prior Publication Data

US 2007/0227692 A1    Oct. 4, 2007

(51) Int. Cl.
    *F25D 21/14*    (2006.01)
(52) U.S. Cl. .............................. 62/288; 62/285; 62/291
(58) Field of Classification Search ................... 62/285, 62/288, 289, 290, 291, 91, 202, 274
    See application file for complete search history.

(56) References Cited

U.S. PATENT DOCUMENTS 3,038,772 A * 6/1962 Schafer ...................... 312/229

3,561,230 A * 2/1971 Gatton ......................... 62/256

FOREIGN PATENT DOCUMENTS

JP        11348527 A  * 12/1999

* cited by examiner

*Primary Examiner*—Chen-Wen Jiang
(74) *Attorney, Agent, or Firm*—Dierker & Associates, P.C.

(57) ABSTRACT

The present invention relates to HVAC units with condensate drainage systems, for use in motorized vehicles.

The present invention provides for at least two or dual condensate drain paths with no extra parts required pre-distribution of the treated air from the HVAC unit, the drainage means or channel situated to allow condensate to 'fall back' or, to run upstream back from the evaporator in the opposite direction to the air in the main airflow or stream which continues to run downstream from the drainage area to be conditioned by the heat exchanger.

22 Claims, 4 Drawing Sheets

HVAC LATERAL CONDENSATE DRAIN CHANNEL

FIELD OF THE INVENTION

The present invention relates to the field of HVAC units that form condensate during normal operations, and, particularly, HVAC units with condensate drainage systems, for use in motorized vehicles.

BACKGROUND OF THE INVENTION

In HVAC units, heat exchangers, due to changing temperature and other conditions within an essentially closed environment, end up forming condensate from the air inputted into the HVAC unit. It is undesirable for excess humidity or condensate to remain in the HVAC unit, or to be distributed downstream of the heat exchangers after the air is conditioned in the unit to the outside areas, such as the passenger and other motor vehicle compartments.

In prior art HVAC unit, this undesirable condensate has often been drained from the area of the heat exchanger, such as an evaporator, by exhausting and/or evacuating the condensate from areas beneath the evaporator via a separate or 'segregated' channel which is found away from the main airflow path through the HVAC unit, and, particularly, the airflow path coming from the air propulsion device or blower. The air in this airflow path, therefore, flows, after blower, into an expansion zone and possible turning housing downstream of the blower expansion zone. In most cases, the condensate channel or drain is found underneath the blower or blower expansion region in a separate or segregated fashion or downstream of the evaporator. The drain is separate from the main air flow function of the HVAC. Prior art HVAC's, therefore allow the water to drain unhindered by the main airflow in the HVAC and, the drain air path is never exposed to the blown airflow upstream of the evaporator. Because of this HVAC architecture, prior art HVAC units are often designed so that condensate in the drain or channel does not interact with the blown air of the HVAC itself in any appreciable way. Hence the condensate drains away freely, unhindered or disturbed by the airflow from the blower in the HVAC.

The present architectures mean that if a drain were open up to an area at or just downstream of the blower, a negative impact would result due to the fact that there would be a direct open air path allowing drainage wall to be entrained into the airflow path to HVAC unit from the blower expansion zone through the drain to the exterior of the HVAC unit. An open drain anywhere between the area of the blower expansion zone up to the evaporator intake region, (possibly a turning area), would normally be thought of as a detriment to the airflow quantity requirement of the unit if, an excessive quantity of air escaped.

SUMMARY OF THE INVENTION

The present invention, therefore, allows for drainage of condensate (such as water or other fluids) in the incoming airstream, that normally enter the HVAC outside of the HVAC unit itself, to be exhausted. The present invention provides for at least two condensate drain paths with no extra parts required pre distribution of the treated air from the HVAC unit. In preferred embodiments of the present invention, the drainage means or channel is situated to allow condensate to 'fall back' or, to run upstream back from the evaporator in the opposite direction to the air in the main airflow or stream which continues to run downstream from the drainage area to be conditioned by the heat exchanger, and, more preferably, from the evaporator. This provides for air in the outflow region directly downstream from the evaporator to be shedded of its condensate should the need arise, and still allow drainage of the condensate, without entrainment of the condensate back into the airflow so that it would eventually get to the distribution system downstream of the HVAC unit itself. Advantageously, the present invention allows for both the air propulsion means (e.g. blower) and the heat exchanger, and, preferably, the evaporator, to be positioned at approximately the same level vertically in space, i.e. at approximately the same height at the base of each, so that, if one is slightly higher, (for example, a 10% difference in level or on the same plane horizontal to the ground in normal operating position of the vehicle), it will still operate, while preventing any backflow of condensate or water, under nearly all vehicle parking orientations, in the air that might otherwise be in or downstream of the drainage area, to reach upstream areas like the blower or the area immediately downstream from the blower.

In prior art HVAC units, water is often blown back under the evaporator pan or drainage area during normal operations. Separate or segregated paths or 'dual paths', one for the condensate drain and one for the air flow, has meant increased tooling complexity and other manufacturing difficulties. In addition to cost issues, problems with quality and tool maintenance are intensified due to this dual path system. The dual path systems have also led to additional problems, particularly since in areas at or near the base of the evaporator, where the airflow means that moving air directly contacts that portion of the evaporator, either slots or slopes are required to allow water to pass through with the drain airstream into a drain pan under the evaporator itself. Such an architecture has been required to prevent water from 'pooling' or otherwise being formed and remaining upstream of the evaporator, allowing such pooled water to stagnate or remain and cause additional problems such as development of odor or microbial growth in the unit. An additional problem from the commercial standpoint rests in the fact that 'pooled' or 'stagnant' condensate upstream of the evaporator can later flow backward into the area of the blower at blower speeds and/or during vehicle maneuvering or parking below a certain level, causing eventual electro-mechanical warranty problems for such units.

In particularly preferred embodiments of the present invention, tooling is simplified due to its dual path drainage. Condensate, since it does not stagnate or collect in unwanted areas, does not create unwanted odor formation or other related undesirable effects related to condensate retention. In more preferred embodiments, condensate for the airstream drains not only from directly under the evaporator, but also before evaporator, through the same mechanism. In even more particularly preferred embodiments, condensation that forms or collects at all locations prior to reaching the heat exchanger, and, in particular, the evaporator region, flows to the same area and, preferably, through the same drainage channel, even more preferably, a U shaped drainage channel. The impact on noise is minimal to non-existent in preferred embodiments of the present invention. By preventing condensate from 'flowing back' into the blower area once it has passed the region of the upstream edge of the U drain, even during heavy accelerations, the present invention allows for the maximum of condensate free air to reach the distribution area for delivery outside of the HVAC unit.

DETAILED DESCRIPTION OF THE PRESENT INVENTION

Figure 1:
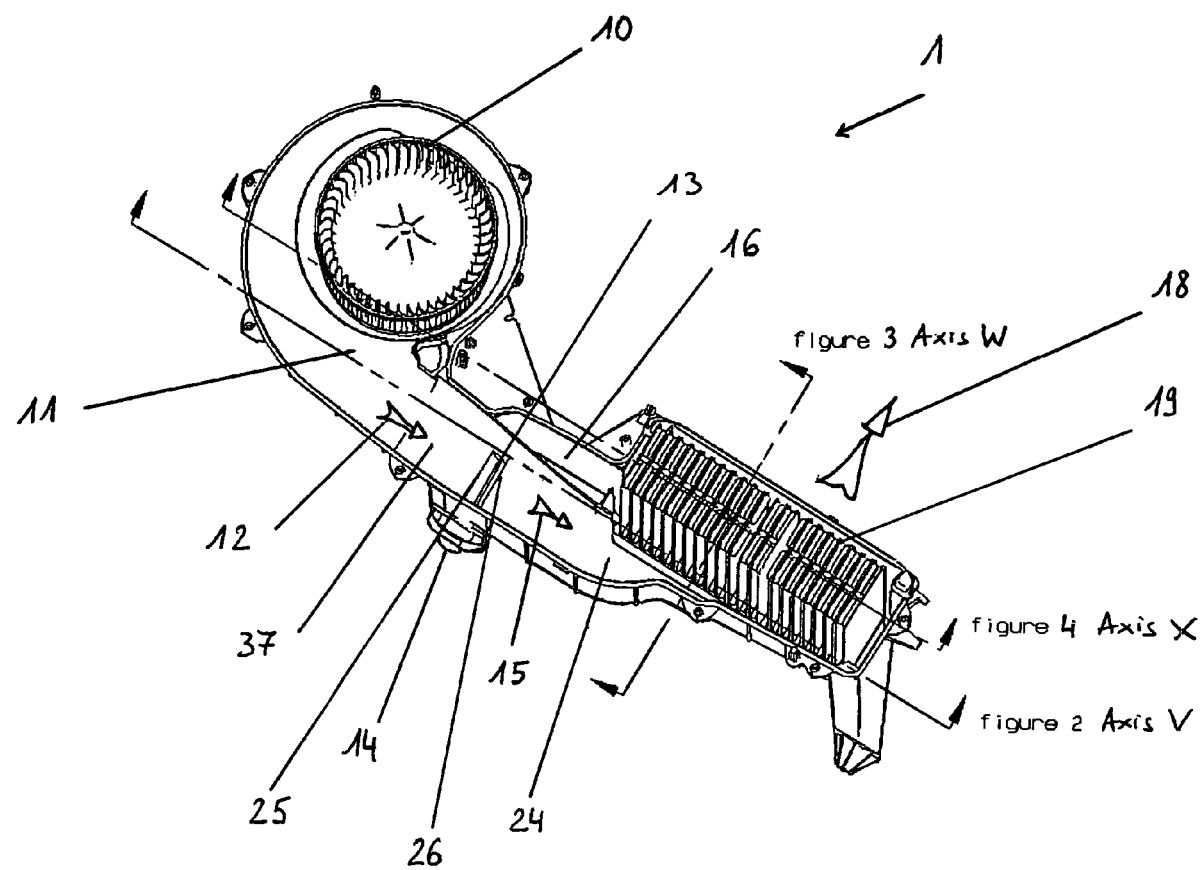
FIG. 1 is a perspective internal view of an HVAC unit, in according with an aspect of the present invention.

As seen above, the current architecture of many prior art HVAC units, particularly those units in a semi-lateral orientation, have lead to a number of problems for which no adequate solution has been found. The present invention solves a number of the prior art problems, while providing for increased simplicity and lower production costs related to the method of removing condensate from HVAC units. In preferred embodiments of the present invention, the present invention relates to an HVAC unit, and, preferably, an HVAC unit for an automotive vehicle, wherein a condensate drain or 'dual path' system is provided. In addition, the present invention leads to much simpler tooling and tooling design due to the multi path system over previous one-path systems. Such improved tooling of the HVAC drainage area provides the heretofore unachievable advantage of simpler maintenance and quality improvements due to the decreased complexity of the HVAC water removal components as a whole. Since condensate leaves the air inflow and air outflow faces of the evaporator and passes to the same. Drainage area and channel, a much simpler and more effective design can be made.

In prior art HVAC units, it is often necessary to have 'covers' or 'cap or plate', such as plastic covers, over one or more of the drain channel(s) In more preferred embodiments of the present invention, the one or open path system provides for an HVAC unit without additional covers, such as plastic covers.

In preferred embodiments of the present invention, an HVAC unit, and, more preferably a laterally oriented or lateral HVAC unit with a condensate draining system comprises: a housing; a air propulsion means or blower; an air flow provided by the propulsion means; a heat exchanger downstream of the air propulsion means; and a channel or drain means downstream of the air propulsion means and upstream of the heat exchanger. The channel or drain preferably drains condensate from the air flow upstream up to the area of the channel or drain means and upstream from the heat exchanger in two separate or dual paths. More preferably, the drain means is a U shaped channel or drain. Also more preferably, the U shaped channel or drain has a step.

In preferred embodiments of the present invention, a step is provided. In more preferred embodiments, the side of the step downstream of the air propulsion means that contacts the air flow upstream up to the area of the channel or drain is higher than the side of the step downstream of the channel or drain.

Also, in more preferred embodiments comprising a step, the drainage means is a channel or drain and the side of the step downstream of the air propulsion means that contacts the air flow upstream up to the area of the channel or drain is higher than the side of the step downstream of the channel or drain.

As described above, preferred HVAC units in accordance with the present invention are lateral HVAC units. Also preferred are HVAC units that have a second or secondary drain with or without drain pan, through which condensate drains from the air outflow side of the heat exchanger prior to exiting the drain, and, preferably, a U shaped drain, and leaving the HVAC unit.

In preferred embodiments of the present invention, the HVAC unit has a heat exchanger and/or an evaporator. In most preferred embodiments, the heat exchanger has an evaporator. In preferred embodiments, and especially where the heat exchanger is an evaporator, the U shaped channel or drain has a gap at its center, and the air from the air flow jumps, clears or misses the gap such that a slightly lower pressure exists in the area of the drain due to the movement of the air. In such embodiments, the condensate is drawn down into a slope of the U shaped drain or channel due partly to the lower pressure at the area of the U shaped drain or channel. Also preferred are HVAC units wherein the lower edge of the blower and the lower edge of the evaporator are at approximately the same height.

Also, in more preferred embodiments of the present invention, the dual path nature allows for more efficient molding, particular for plastic and plastic like parts of the HVAC unit including parts such as the evaporator housing, and condensate drain. The plastic parts of the present invention can be molded, and, preferably injection molded. The present invention, therefore, provides, in even more preferred embodiments, for HVAC units to be essentially composed of a resin, or resin like or resin based HVAC unit, with only a one piece molding of the drain area. The resin, resin like or resin based HVAC unit, and, particularly, the drainage means comprised of drainage members or apparatuses, provides for dual path for water condensate to flow through a drain, while further ensuring that no condensate flows back or backs up upstream of the drain area due to the lateral or semi-lateral position of the HVAC unit. Therefore, the airflow in the HVAC unit is airflow that is of reduced water content downstream of the drain area, with no increase or re-entrainment of water upstream of the drain area.

In preferred embodiments of the present invention, unlike the prior art molding to segregate the water condensate flow to the drain, from, the air-flow in the HVAC, the condensate drain is formed in a U shape. In preferred methods of the present invention, the U shaped drain is shaped such that it forms a step down from downstream of the blower to the upstream of the evaporator. In other words, the drain is constructed by shaping the upstream (blower side) side of the main U drain such that the flow in the expansion area after the blower causes a 'suction' or lower pressure region as the airflow passes the 'backward facing step' or step, cliff, precipice, wall, and continues onward towards the downstream end of the drainage area.

In more preferred embodiments of the present invention, the condensate drainage channel or, more preferably, the U shaped drain, passes as an open type channel (i.e. a hole or opening from the interior of the U shaped drain to the interior of the HVAC unit where the main flow is). As described above, the condensate drainage channel preferred in the present invention is typically a U like shape or any shape that allows no air flow spitting, no condensate return upstream, provides for water drainage from both water paths, and water check valve to prevent incoming airstream water to be drained from the blower. The step has two faces, (the upstream one) is typically taller than the other limb (the downstream one). This creates the 'backward facing step' geometry allowing the two streams to pass over (the air) and under (the condensate water) one another.

By step in the present application, it is meant an abrupt or marked change in height of a surface allowing easy motion from the higher to lower, but not from the lower to higher, side of surface.

In the preferred embodiments of the present invention, water in the form of condensate, drains towards the drainage area. Water still present in the airflow downstream of the drainage area can still eventually drain as condensate when precipitated after passage of the air downstream of the drain area, due to the negative pressure condition present in the drainage area. In preferred embodiments, therefore, air, after arriving to and passing by the dual path drain from downstream of the blower and drainage area, allows water in the air to precipitate as condensate and to 'drain back' towards the drainage area from the air inflow face/region of the evaporator downstream of the drainage area, thereby allowing better evaporator cooling performance to be attained. By providing for a drain that is upstream of the evaporator, such improved evaporator cooling performance is obtained to a large extent due to the fact that condensate that forms from the air immediately upstream of the evaporator can drain without the need for a bypass under the lower front edge of the evaporator or other mechanism pre-evaporator. In the preferred embodiments of the present invention, condensate drains back from the air inflow face at an opposing current to the airflow leading to the evaporator in spite of the fact that the vehicle may be experiencing heavy G forces from cornering, breaking or accelerating. In prior art HVAC units, when vehicles face such heavy G forces from cornering, braking and/or accelerating, the fact that there is no mechanism for condensate removal for condensate 'back flow' means that water, in the form of condensate, would normally run back upstream towards and/or into the blower or blower area.

As described hereinabove, in prior art designs the lower edge of the HVAC blower can be located at the same level vertically in normal vehicle operating position at the lower edge of the HVAC heat exchanger, and, especially, the evaporator of the HVAC. In these prior art designs, problems in this positioning can occur, particularly during periods of normal operation of the vehicle, when acceleration needs are most required (heavy acceleration) e.g. cornering. As described above, when a heavy acceleration occurs in such units, water in the airflow can form condensate that may flow back towards or into the blower, causing warranty issues. This present invention, by providing for a drainage system, and, in particular a drainage system with a negative pressure drop feature, provides for a high resistance to condensate backflow and/or drainage prior to reaching the area upstream of the drainage area near or at the blower level and provides for a step, facing the returning water or condensate stream, the step stopping the water or condensate.

Figure 2:
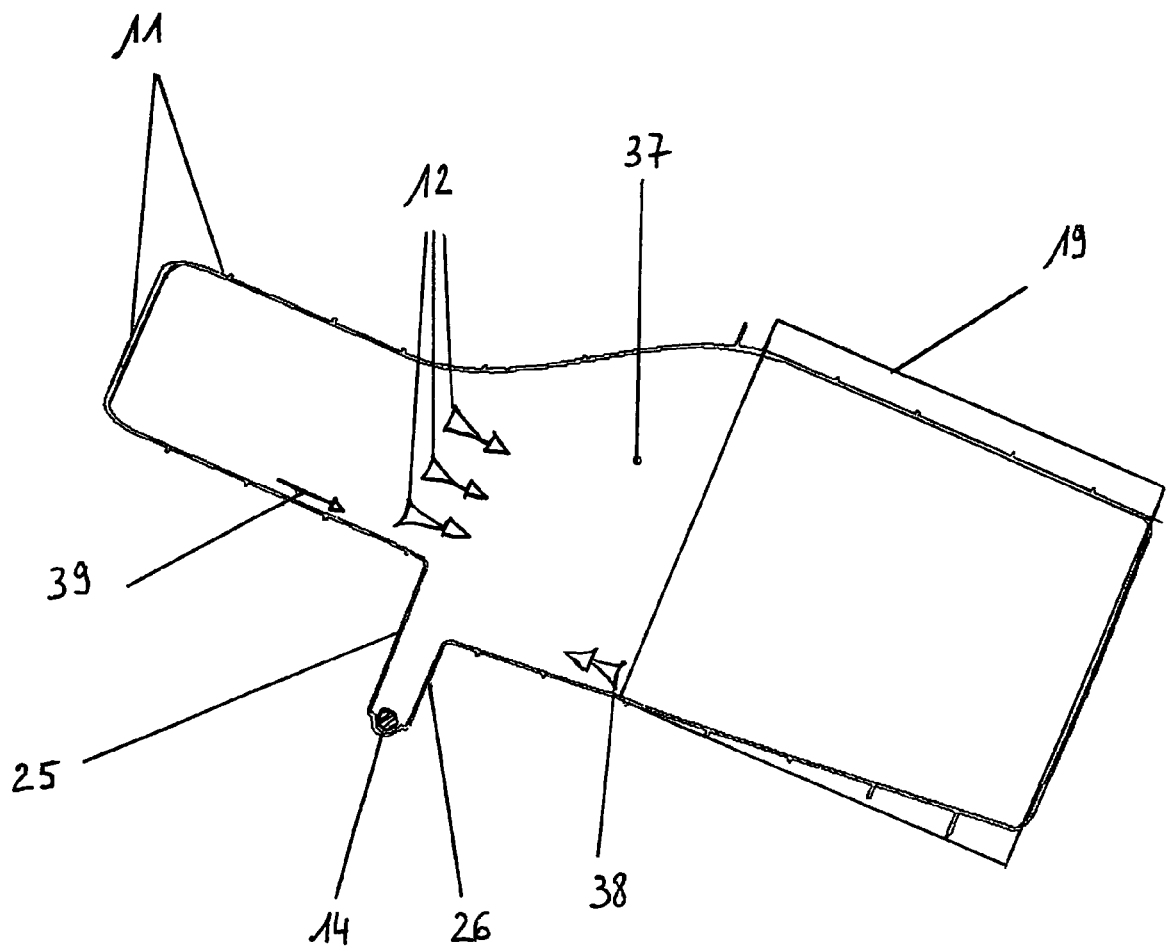
FIG. 2 is a schematic view of an HVAC unit in accordance with an aspect of the present invention, showing airflow and condensate pathways and an area of low pressure or suction region of at the drainage region and condensate ingress from an area outside of the normal HVAC airflow and drainage area, in accordance with an aspect of the present invention.
Figure 3:
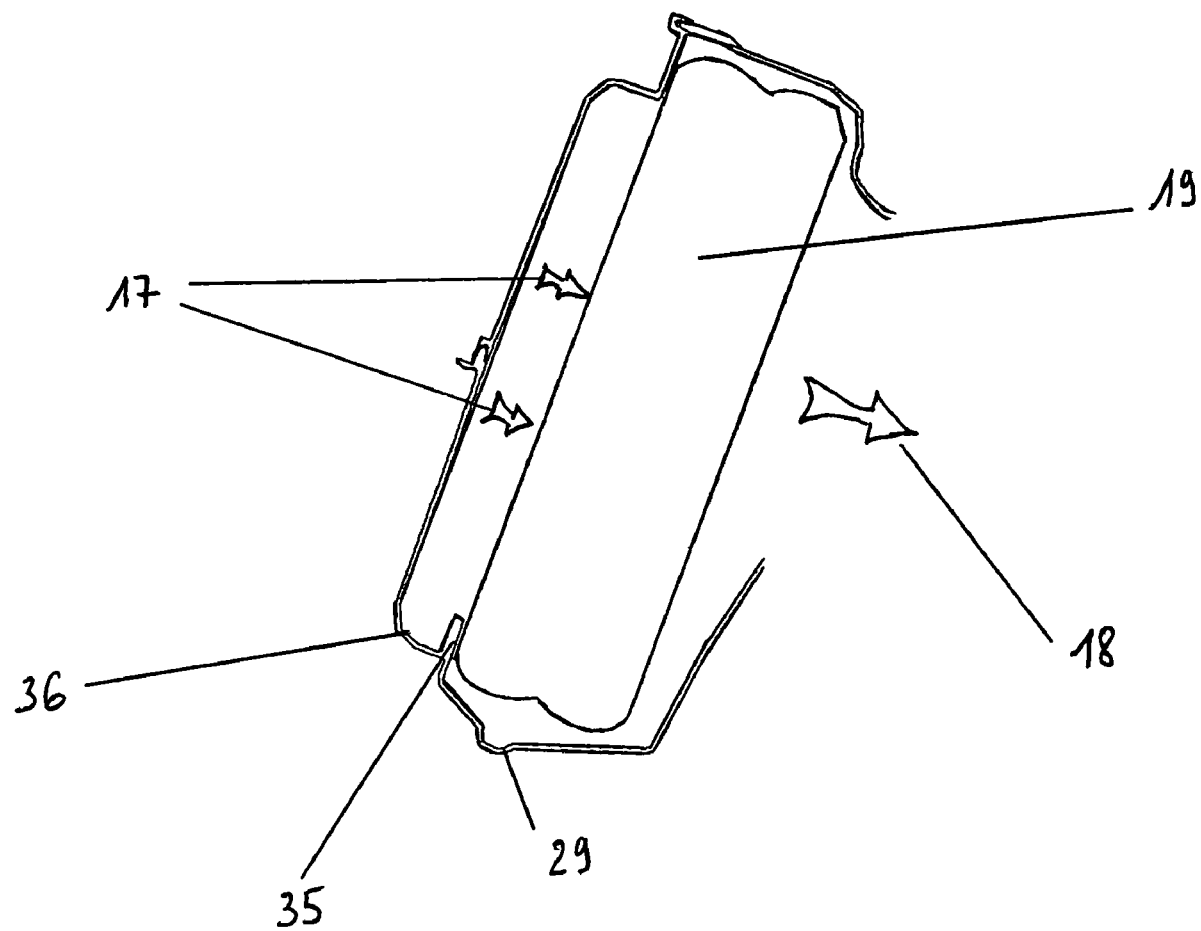
FIG. 3 is a perspective view of an HVAC unit showing the drain channel with upstream and downstream faces or sides, in accordance with an aspect of the present invention.
Figure 4:
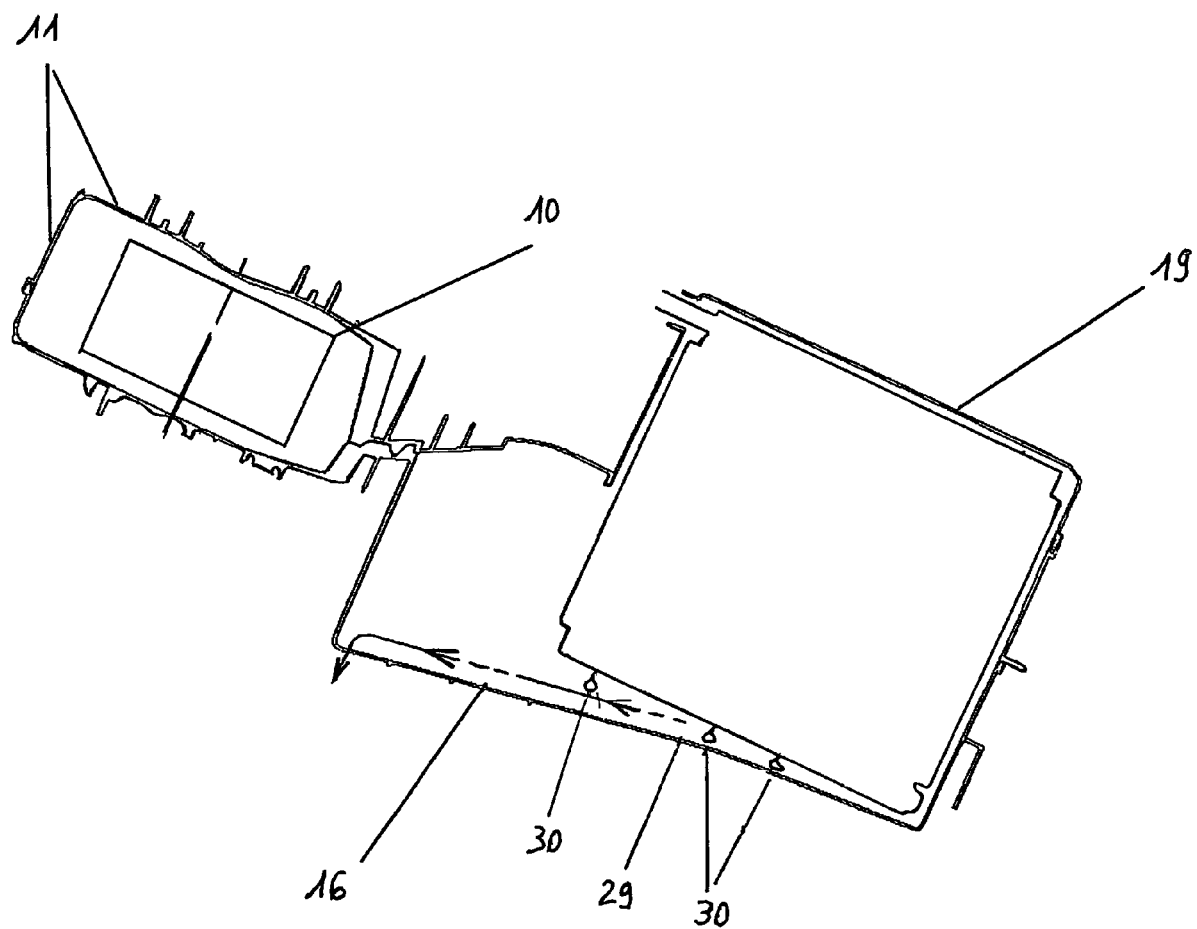
FIG. 4 is a schematic view of an HVAC unit with condensate flow from upstream and downstream of the drainage area with step, in accordance with an aspect of the present invention.

Referring to FIGS. 1 and 2, is shown a general layout of the one of the embodiments of the present invention, with Axis V, W and X denoting the section cuts provided in FIGS. 2, 3, and 4 respectively having a blower 10 within a scroll 11, an expansion area 37, a turning area 24, the evaporator having an air inflow (upstream) 15, 24 and air outflow (downstream) 18 face or area. U channel or drain 13 crosses perpendicularly under the expansion area 37 with air-flow 12 provided over the upstream or taller limb and the downstream lower limb of the U shaped channel. This main U channel 13 is connected to the evaporator drain/pan channel preferably via a channel 16 generally parallel to but offset from the main airflow 15, 12.

Referring to FIG. 2, an HVAC unit with ingressed condensate 39 is shown. Once the ingressed water has passed over the drain region, the aforementioned process happens.

In more preferred embodiments of the present invention, drainage channel 13, 14, 16 is constructed to have a backward facing step 25, 26 in the drain region 13, 14 where the airflow 12 jumps or crosses over the drain 13. The airflow 12 crosses over the drainage area 13, 14, 25, 26 without jetting down into the drain 13, 14, and hence, not causing noise or losing inordinate amounts of airflow through the drain 14. Furthermore the drainage pan 29 from the evaporator underside, allows water or condensate to drain back down to the said U shaped drainage channel 14, 13.

In preferred embodiments of the present invention, as shown in FIGS. 1, 2 and 3, condensate from both the air inflow upstream 17 plus air outflow downstream 18 side of the evaporator 19 exits easily to the drain 29, 16, 14, 13. The lower edge 35 on the inlet side (upstream side) 17 of the evaporator 19 can be better sealed without worry of trapping stagnant water that cannot be drained. The water (condensate 30) from the evaporator air flow region 36 cannot drain back towards the blower area 11, 12 or the blower 10 due to the step 25, 26 in the expansion 37 or area after the blower connecting to the corner housing. The blower 10 to evaporator 19 relative positioning is efficient and more favorable with the use of this invention. Wall or rib 35 holds or maintains the bottom of the evaporator, as well as prevents condensate from passing directly under the evaporator from the air inflow side.

Referring to FIG. 4, condensate 30 from the evaporator 19 falls into a pan or collection area 29, which leads via a channel 16, cut through, but preferably integral with, the air-flow expansion region 37 of the HVAC 10. The condensate 30 is drawn back towards the drain 13, from the pan or collection area 29 of the underside of the evaporator 19 due to the suction or dynamic pressure 14 of the flow in the expansion region 12 via the drainage channel 13. Condensate 30 movement upstream of the evaporator (flow) vis a vis the evaporator 19 and upstream flow 38 towards the evaporator does not occur, because of the shape of the limbs 25, 26 of the upstream (taller) 25 and downstream (lower) 26 sides of the U drainage channel 13, 14 cut in the air-flow expansion region 37 to ensure that adequate drainage of condensate to outside of the HVAC unit 1 occurs. The backward facing step or difference in height variation of 25 relative to 26 allows an area of relatively negative or suction pressure 14 to form in the drain 13 rather than allowing relatively positive pressure to form. From this pressure stand point the drain functions as normal, assisting the drainage of condensate from both sides 17, 36, 12, 29 of the evaporator, rather than stagnate or collect in unwanted areas 10 of the HVAC unit.

The present invention can also very easily handle the evacuation of liquid such as rain, water moisture, windshield wiper and other automotive and cleaning fluids, etc., ingression into the HVAC unit from/via other means. Such as ingress from the dry or wet plenums of the car water separation apparatus during rain, car washing, windshield washing means water from the blower region of the HVAC will be cast or thrown or projected along through, preferably, the expansion part of the HVAC. A part or some of the liquid or condensate can fall directly into the drainage channel 13 or drain area 14, while a second part of the liquid or condensate passes through/underneath the evaporator to the drainage means described. The drainage means or structure, and, in particular, the channel's U shape causes the back flow of the condensation to be impeded, therefore, stopping any ingressed liquid or condensate to find its way back to the blower area or blower.

The present invention also allows for the lower edge of the blower to be located at a level approximately level with the evaporator. This positioning of blower and evaporator allows to an overall advantage with respect to HVAC packaging environment, allowing for large recirculation fresh air inlet possible, containing an air filter. The U shaped drain allows for a larger space for filter.

In preferred embodiment of the present invention, the drain means or structure is a preferred sloping U shaped channel from the underside of the evaporator preferably traveling firstly parallel and then counter to the airflow. Then secondly the U shaped channel then turns to be generally/preferably perpendicular to the airflow, but stepped in such a way as to allow the airflow to jump over the U or water drainage channel. The jumping action causes an aerodynamic lower pressure in the U channel, indicating that the airflow has no intention of directly entering the said channel, or having any intention to return airflow back up into the underside of the evaporator area. Hence the drain drains correctly.

The preferred embodiment of the present invention has been disclosed. A person of ordinary skill in the art would realize, however, that certain modifications would come within the teachings of this invention. Therefore, the following claims should be studied to determine the true scope and content of the invention.

The invention claimed is:

1. A motor vehicle HVAC unit, comprising:
   a housing;
   a blower to provide air flow in the HVAC unit;
   an evaporator;
   a drain between the blower and the evaporator, the drain being a sloping U shaped channel from the underside of the evaporator, the sloping U shaped channel being parallel and counter to the air flow and thereafter perpendicular to the air flow; and
   a step;
   wherein the drain and the step are upstream of the evaporator and downstream of the blower, such that condensate from the air flow is prevented from entering the blower area under conditions of vehicle maneuvering or parking.

2. The motor vehicle HVAC unit as in claim 1 wherein the HVAC unit is a laterally oriented HVAC unit, and wherein the blower area is upstream of the step.

3. The motor vehicle HVAC unit as in claim 2 wherein the drain is physically located between the blower and the evaporator.

4. The motor vehicle HVAC unit as in claim 3 wherein the condensate from downstream of the evaporator passes through the U shaped channel.

5. The motor vehicle HVAC unit as in claim 4 wherein the step comprises two sides, a side nearer to the blower and a side nearer to the evaporator, forming a gap between the two sides.

6. The motor vehicle HVAC unit as in claim 5 wherein the U shaped channel is found in the gap between the sides.

7. The motor vehicle HVAC unit as in claim 6 wherein the HVAC unit has at least one channel or path leading to the U shaped channel, such that condensate in the channel flows into the U shaped channel.

8. The motor vehicle HVAC unit as in claim 7 wherein the HVAC unit has another channel or path leading to the U shaped channel.

9. The motor vehicle HVAC unit as in claim 8 wherein all channels or paths that have flows of condensate in the HVAC unit lead to the U shaped channel.

10. The motor vehicle HVAC unit as in claim 6 wherein the side of the step nearer the blower is of a height such that condensate is prevented from flowing back from the blower area once it has passed the area of the gap of the step.

11. The motor vehicle HVAC unit as in claim 7 wherein the HVAC unit is part of an automobile vehicle.

12. The motor vehicle HVAC unit as in claim 8 wherein the HVAC unit is part of an automotive vehicle.

13. The motor vehicle HVAC unit as in claim 3 wherein the drain is formed in between the sides of the step, and wherein the step is located in the housing between the evaporator and the blower.

14. The motor vehicle HVAC unit as in claim 13 wherein the drain is found downstream from the evaporator and upstream of the blower.

15. The motor vehicle HVAC unit as in claim 14 wherein the step has two facing sides, one side nearer the blower and one side nearer the evaporator, and wherein the side nearer the blower is higher than its facing side.

16. The motor vehicle HVAC unit as in claim 15 wherein the evaporator and the blower are found in the housing, both having bottom edges in line with a plane of the HVAC unit such that the lower edge of the blower and the lower edge of the evaporator are approximately at the same level along the plane.

17. The motor vehicle HVAC unit as in claim 16 wherein the plane is basically horizontal when the HVAC is in its lateral position.

18. The motor vehicle HVAC unit as in claim 13 which is a laterally oriented HVAC unit in the motor vehicle.

19. The motor vehicle HVAC unit as in claim 15 wherein the step has two sides, and wherein the side nearer the blower is of a height such that no condensate pools or stagnates upstream of the evaporator.

20. The motor vehicle HVAC unit as in claim 1, further comprising an expansion area, the expansion area including the drain and the step.

21. The motor vehicle HVAC unit as in claim 20 wherein the drain is positioned generally perpendicularly to the expansion area.

22. The motor vehicle HVAC unit as in claim 21 wherein the drain crosses perpendicularly under the expansion area.

* * * * *